United States Patent
Yamane et al.

(10) Patent No.: US 11,267,190 B2
(45) Date of Patent: Mar. 8, 2022

(54) METHOD FOR PRODUCING SKIN MATERIAL

(71) Applicant: TOYOTA BOSHOKU KABUSHIKI KAISHA, Aichi (JP)

(72) Inventors: Ryo Yamane, Aichi (JP); Yoshiaki Toumasu, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 302 days.

(21) Appl. No.: 16/520,954

(22) Filed: Jul. 24, 2019

(65) Prior Publication Data
US 2020/0039137 A1 Feb. 6, 2020

(30) Foreign Application Priority Data
Aug. 1, 2018 (JP) .............................. JP2018-145425

(51) Int. Cl.
*B29C 59/02* (2006.01)
*B29C 59/00* (2006.01)
*B29C 33/40* (2006.01)
*B60R 13/02* (2006.01)
*B29L 31/30* (2006.01)
*B29K 105/00* (2006.01)
*B29K 67/00* (2006.01)
*B29C 43/02* (2006.01)
(Continued)

(52) U.S. Cl.
CPC .......... *B29C 59/026* (2013.01); *B29C 33/405* (2013.01); *B29C 59/002* (2013.01); *B29C 43/021* (2013.01); *B29C 43/52* (2013.01); *B29C 2043/3205* (2013.01); *B29K 2067/00* (2013.01); *B29K 2105/256* (2013.01); *B29K 2819/00* (2013.01); *B29K 2995/007* (2013.01); *B29K 2995/0046* (2013.01); *B29L 2031/3005* (2013.01); *B29L 2031/3014* (2013.01); *B29L 2031/3041* (2013.01); *B60R 13/0243* (2013.01)

(58) Field of Classification Search
CPC .................................................. B29C 59/026
See application file for complete search history.

(56) References Cited

U.S. PATENT DOCUMENTS 3,629,035 A * 12/1971 Kuroda .................. B29C 66/727
156/219
4,121,960 A * 10/1978 Focht ...................... B32B 27/00
156/219
(Continued)

FOREIGN PATENT DOCUMENTS

JP 03-2648 1/1991
JP 06-158527 6/1994
(Continued)

*Primary Examiner* — Benjamin A Schiffman
(74) *Attorney, Agent, or Firm* — Greenblum & Bernstein, P.L.C.

(57) ABSTRACT

The method for producing a skin material includes heat-pressing a raw material using an embossing die to obtain a skin material having a concave part formed on a front surface side and a flat back surface. The raw material is heat-pressed between the embossing die and an elastic mat to form, as the concave part, at least one of a plurality of concave parts for intensity display having different depths of a bottom and a concave part for gradation display in which the depth of the bottom gradually changes.

12 Claims, 11 Drawing Sheets

(51) Int. Cl.
  *B29C 43/32* (2006.01)
  *B29C 43/52* (2006.01)

(56) References Cited

U.S. PATENT DOCUMENTS

| | | | | |
|---|---|---|---|---|
| 4,160,685 | A * | 7/1979 | Kuroda | B29C 66/8322 |
| | | | | 156/219 |
| 4,432,822 | A * | 2/1984 | Adams | B29C 65/02 |
| | | | | 156/148 |
| 4,519,862 | A * | 5/1985 | Urai | B29C 65/02 |
| | | | | 156/219 |
| 4,867,826 | A * | 9/1989 | Wayte | B29C 44/5636 |
| | | | | 156/219 |
| 5,490,890 | A * | 2/1996 | Morrison | B29C 44/569 |
| | | | | 156/219 |
| 6,349,639 | B1 * | 2/2002 | Smith | B31F 1/07 |
| | | | | 101/28 |
| 2008/0122129 | A1 * | 5/2008 | Koivukunnas | B29C 59/026 |
| | | | | 264/1.34 |
| 2013/0025216 | A1 * | 1/2013 | Reichwein | B29C 59/026 |
| | | | | 52/105 |
| 2017/0197354 | A1 * | 7/2017 | Kuwahara | B23K 26/0006 |
| 2017/0233916 | A1 * | 8/2017 | Pyun | B32B 9/047 |
| | | | | 428/35.2 |
| 2020/0316846 | A1 * | 10/2020 | Nakajima | B29C 59/022 |
| 2020/0406578 | A1 * | 12/2020 | Kamide | B32B 5/022 |

FOREIGN PATENT DOCUMENTS

| | | |
|---|---|---|
| JP | 2013-059881 | 4/2013 |
| JP | 2017-113937 | 6/2017 |
| JP | 2017-191509 | 9/2017 |
| JP | 2017-213865 | 12/2017 |

\* cited by examiner

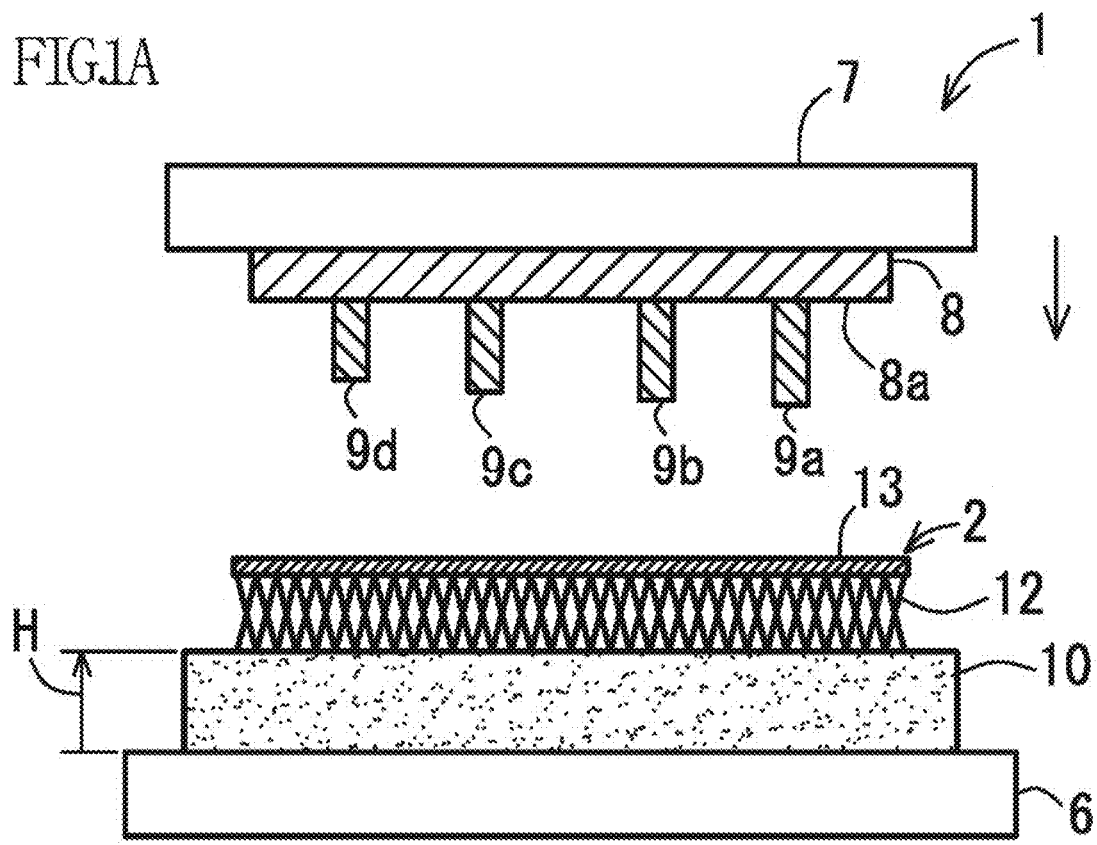
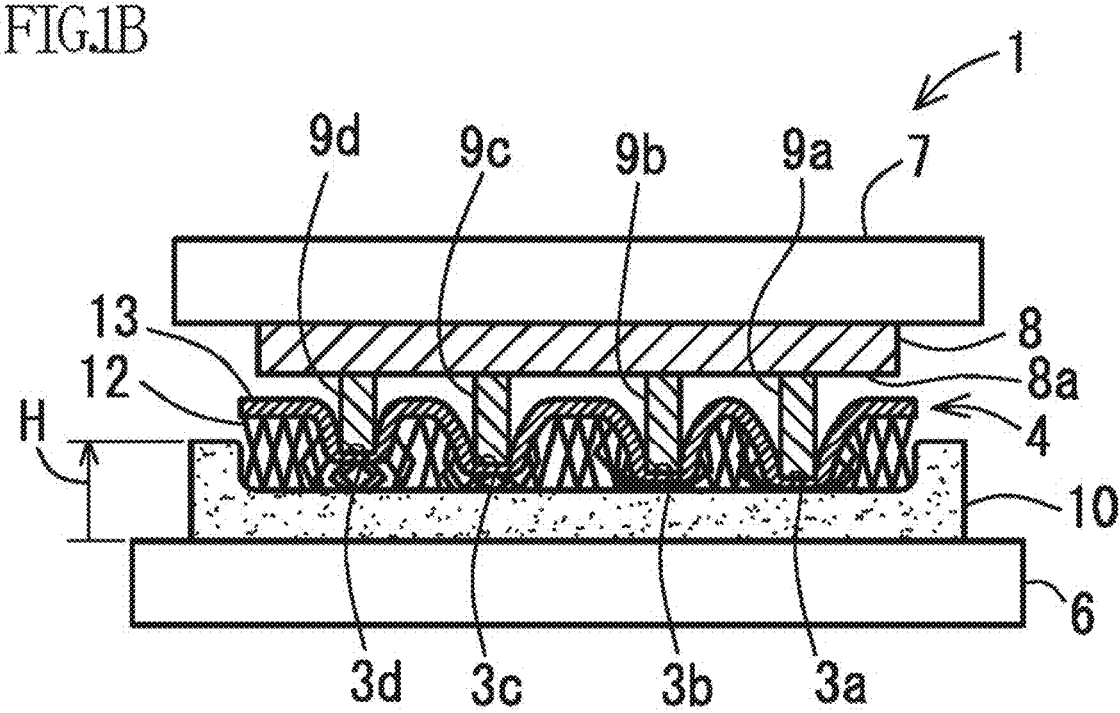

59A

59B

METHOD FOR PRODUCING SKIN MATERIAL

CROSS REFERENCE TO RELATED APPLICATIONS

The present application claims priority under 35 U.S.C. § 119 of Japanese Application No. 2018-145425 filed on Aug. 1, 2018, the disclosure of which is expressly incorporated by reference herein in its entirety.

BACKGROUND OF THE INVENTION

(1) Field of the Invention

The present invention relates to a method for producing a skin material, and more particularly, to a method for producing a skin material having a concave part formed on the front surface side and a flat back surface.

(2) Description of Related Art

As a conventional method for producing a skin material, there is generally known a production method including heat-pressing a raw material using an embossing die to obtain a skin material having a concave part on the front surface side and a flat back surface (for example, JP 2017-213865 A). JP 2017-213865 A describes that the raw material is heat-pressed between the embossing die and a metal pedestal to form a plurality of concave parts for intensity display which are different in depth of the bottom (see, for example, FIG. 7). These concave parts for intensity display can be used to express the intensity of emboss depth which is excellent in aesthetic appearance.

However, in the technique described in JP 2017-213865 A, the raw material is heat-pressed between the embossing die and the metal pedestal. Therefore, a relatively shallow concave part, among the plurality of concave parts for intensity display, hardly receives appropriate pressing force by a pressing rib of the embossing die and cannot be formed clearly. Therefore, under the present circumstances, for example, as shown in FIGS. 12A to 12C, a plurality of embossing dies 108a to 108c are prepared according to a plurality of concave parts 103a to 103c for intensity display, and each of the embossing dies 108a to 108c heat-presses the raw material while controlling the pressure, temperature, pressing time, etc. to form the plurality of concave parts 103a to 103c for intensity display. Hence, many work processes are required, and the cost increases.

It is desired to express a gradation of emboss depth which is excellent in aesthetic appearance by a concave part for gradation display in which the depth of the bottom gradually changes. However, in the technique described in JP 2017-213865 A, the raw material is heat-pressed between the pressing rib of the embossing die and the metal pedestal. Therefore, a relatively shallow portion in the entire bottom of the concave part for gradation display hardly receives appropriate pressing force by the pressing rib and cannot be formed clearly.

Although JP 2017-113937 A describes a production method including heat-pressing a sheet raw material 2 between an embossing plate 41 and a cushion material 45 to obtain a sheet fabric 1. This cushion material 45 is used to bite the sheet raw material 2 into a concave part 41″ of the embossing plate 41 for the purpose of sharpening the corner of a convex pattern 3 of the sheet fabric 1 (see, for example, paragraph [0012] and FIG. 3). Furthermore, in JP 2017-113937 A, the depth of the bottom of each concave pattern 3′ of the sheet fabric 1 is constant and does not gradually change (see, for example, FIGS. 3 and 4).

SUMMARY OF THE INVENTION

Embodiments of the present invention have been made in view of the above actual situation, and an object of the present invention is to provide a method for producing a skin material capable of easily and inexpensively producing a skin material having a concave part capable of emboss expression excellent in aesthetic appearance.

One aspect of the present embodiments provides a method for producing a skin material, the method including heat-pressing a raw material using an embossing die to obtain a skin material having a concave part formed on a front surface side and a flat back surface, wherein the raw material is heat-pressed between the embossing die and an elastic mat to form, as the concave part, at least one of a plurality of concave parts for intensity display having different depths of the bottom and a concave part for gradation display in which the depth of the bottom gradually changes.

In a further aspect, the elastic mat may be formed of silicone rubber, fluororubber, or acrylic rubber.

In a further aspect, the elastic mat may have a hardness of E10 to D100 in accordance with JIS K 6253.

In a further aspect, a pressing rib for forming the concave part may be protruded on a surface of the embossing die, and that, during the heat-pressing, the pressing rib may press a front surface side of the raw material in a state where a surface of the embossing die is separated from the surface of the raw material, thereby forming the at least one of the concave parts for intensity display and the concave part for gradation display.

In a further aspect, during the heat-pressing, a protrusion end of the pressing rib may be positioned on a side closer to the back surface than a surface height of the elastic mat in a natural state to press the front surface side of the raw material.

In a further aspect, the raw material may include a base cloth layer including at least thermoplastic resin fibers and made of a knit, and a skin layer bonded to a surface of the base cloth layer, and that, during the heat-pressing, the raw material may be pressed from the skin layer side by the embossing die, thereby forming in the base cloth layer a concave-shaped heat-deformed part due to heat deformation of the thermoplastic resin fibers, and also the skin layer may follow the concave shape of the heat-deformed part, thereby forming the at least one of the concave parts for intensity display and the concave part for gradation display.

According to the method for producing a skin material of the present embodiment, the raw material is heat-pressed between the embossing die and the elastic mat to form, as the concave part, at least one of a plurality of concave parts for intensity display having different depths of the bottom and a concave part for gradation display in which the depth of the bottom gradually changes. As a result, depending on the pressing height (that is, pressing amount) of the embossing die, a difference is generated in the repulsive force by the elastic mat, so that appropriate pressing force is applied to the raw material. Therefore, a plurality of concave parts for intensity display and/or a concave part for gradation display can be clearly formed by single heat-pressing. Then, the plurality of concave parts for intensity display are used to the intensity (i.e., deep or shallow) of emboss depth excellent in aesthetic appearance. Furthermore, the concave part for gradation display is used to express the gradation of emboss depth excellent in aesthetic appearance.

Further, when the elastic mat is formed of silicone rubber, fluororubber, or acrylic rubber, more appropriate pressing force is applied to the raw material by adopting an elastic mat excellent in impact resilience and heat resistance. Therefore, the plurality of concave parts for intensity display and/or the concave part for gradation display can be formed more clearly.

Further, when the elastic mat has a hardness of E10 to D100 in accordance with JIS K 6253, more appropriate pressing force is applied to the raw material by adopting a relatively soft elastic mat. Therefore, the plurality of concave parts for intensity display and/or the concave part for gradation display can be formed more clearly.

In addition, when a pressing rib for forming the concave part is protruded on the surface of the embossing die, and, during the heat-pressing, the pressing rib presses the front surface side of the raw material in a state where the surface of the embossing die is separated from the surface of the raw material, thereby forming the at least one of the concave parts, the surface heat deterioration of the skin material is suppressed by reducing the contact region of the embossing die with the raw material to a minimum necessary level.

When, during the heat-pressing, a protrusion end of the pressing rib is positioned on a side closer to the back surface than a surface height of the elastic mat in a natural state to press the front surface side of the raw material, more appropriate pressing force is applied to the raw material, so that the plurality of concave parts for intensity display and/or the concave part for gradation display can be formed more clearly.

Furthermore, when the raw material includes a base cloth layer and a skin layer, and, during the heat-pressing, the raw material is pressed from the skin layer side by the embossing die, thereby forming in the base cloth layer a concave-shaped heat-deformed part due to heat deformation of the thermoplastic resin fibers, and also the skin layer follows the concave shape of the heat-deformed part, thereby forming the at least one of the concave parts, a base cloth layer made of a knit fabric is adopted, thereby making it possible to more clearly form the plurality of concave parts for intensity display and/or the concave part for gradation display and to obtain sufficient cushioning properties.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1A and 1B are explanatory views for explaining a method for producing a skin material according to Example 1, in which FIG. 1A shows a longitudinal sectional view of an embossing machine in a die open state, and FIG. 1B shows a longitudinal cross-sectional view of the embossing machine in a die close state;

FIGS. 2A and 2B are explanatory views for explaining the method for producing a skin material, in which FIG. 2A shows a longitudinal sectional view of a raw material, and FIG. 2B shows a longitudinal sectional view of a skin material;

FIGS. 5A and 5B are explanatory views for explaining a method for producing a skin material according to Example 2, in which FIG. 5A shows a longitudinal sectional view of an embossing machine in a die open state, and FIG. 5B shows a longitudinal cross-sectional view of the embossing machine a die close state;

FIGS. 6A and 6B are explanatory views for explaining the method for producing a skin material, in which FIG. 6A shows a longitudinal sectional view of a raw material, and FIG. 6B shows a longitudinal sectional view of a skin material;

FIGS. 7A and 7B is an explanatory view for explaining methods for producing a skin material according to an experimental example and a comparative example, in which FIG. 7A shows a longitudinal sectional view of an embossing machine used in the production method of the experimental example, and FIG. 7B shows a longitudinal cross-sectional view of an embossing machine used in the production method of the comparative example;

FIGS. 8A and 8B are explanatory views for explaining skin materials obtained by the production methods of the experimental example and the comparative example, in which FIG. 8A shows an image-processed view of an emboss pattern of the skin material obtained by the production method according to the experimental example, and FIG. 8B shows an image-processed view of an emboss pattern of the skin material obtained by the production method according to the comparative example;

FIGS. 10A to 10D are explanatory views for explaining a skin material according to another embodiment, in which FIG. 10A shows a form in which annular and independent concave parts for intensity display are formed, FIG. 10B shows a form in which concave parts for intensity display were formed, FIG. 10C shows a form in which a plurality of concave parts for gradation display are formed, and FIG. 10D shows cross-sectional view taken along line c-c;

FIGS. 11A and 11B are explanatory views for explaining a skin material according to another embodiment, in which FIG. 11A shows a longitudinal sectional view of a raw material, and FIG. 11B shows a vertical sectional view of a skin material; and FIGS. 12A to 12C are explanatory views for explaining a conventional method for producing a skin material, in which FIG. 12A shows a state where the deepest concave part is formed, FIG. 12B shows a state where a medium deep concave part is formed, and FIG. 12C shows a state where the shallowest concave part is formed.

DETAILED DESCRIPTION OF PREFERRED EMBODIMENTS

Figure 2A:
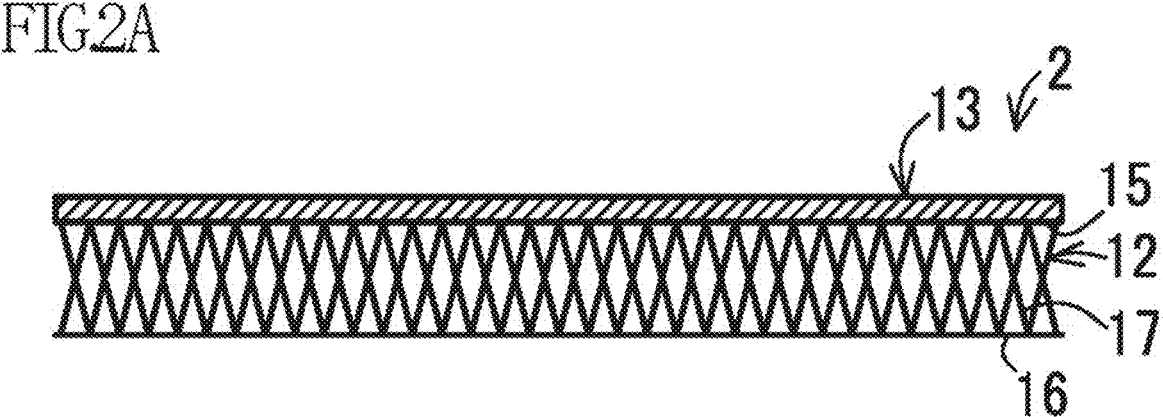

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A method for producing a skin material according to the present embodiment includes heat-pressing a raw material (2) using an embossing die (8, 38) to obtain a skin material (4) having a concave part formed on the front surface side and a flat back surface. The raw material (2) is heat-pressed between the embossing die (8, 38) and an elastic mat (10) to form, as the concave part, at least one of a plurality of concave parts (3a to 3d) for intensity display having different depths of the bottom and a concave part (33) for gradation display in which the depth of the bottom gradually changes (see, e.g., FIGS. 1A, 1B, 5A, and 5B).

There are no particular limitations on the shape, number, arrangement, etc. of the plurality of concave parts (3a to 3d) for intensity display. As the plane shape of the bottom of each of the concave parts (3a to 3d) for intensity display, one or a combination of two or more of linear, planar, and annular shapes is indicated, for example. Further, the plurality of concave parts (3a to 3d) for intensity display can be juxtaposed, for example, in a longitudinal cross section in the thickness direction of the skin material (4) (see, for example, FIGS. 2A and 2B). In this case, a difference (S) in depth of the bottom between the adjacent concave parts (3a to 3d) for intensity display may be, for example, 0.1 to 5 mm (preferably 0.5 to 3 mm). If the difference (S) in depth of the bottom is within the above range, the intensity (that is, deep or shallow) of emboss depth is more effectively expressed by each of the concave parts (3a to 3d) for intensity display.

Figure 6A:
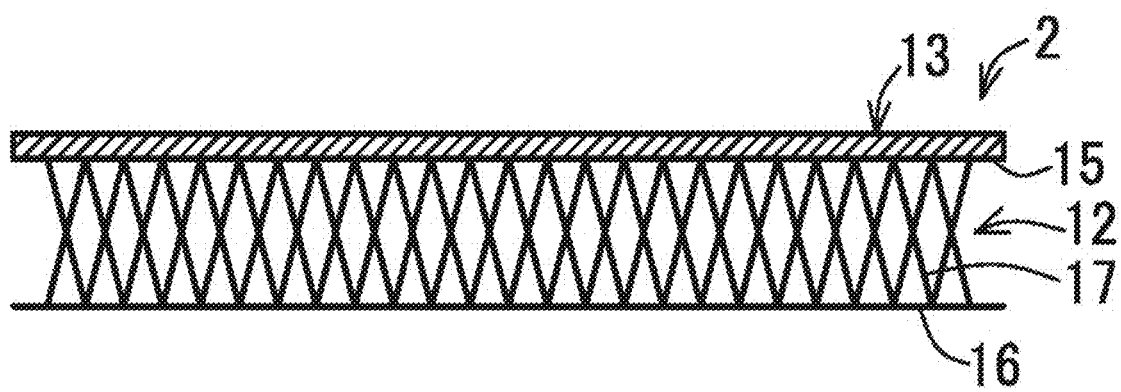

There are no particular restrictions on the shape, number, arrangement, etc. of the concave part (33) for gradation display. As the plane shape of the bottom of the concave part (33) for gradation display, one or a combination of two or more of linear, planar and annular shapes is indicated, for example. In addition, the concave part (33) for gradation display may have, for example, one or more inclined surfaces (44) which are inclined with respect to the back surface of the skin material in a longitudinal section in the thickness direction of the skin material (4) (for example, see FIGS. 6A and 6B). The difference (S) in depth of the bottom between both end parts (44a, 44b) of the inclined surface (44) may be, for example, 0.1 to 5 mm (preferably, 0.5 to 3 mm). If this difference (S) in depth of the bottom is within the above range, the gradation of emboss depth is more effectively expressed by the concave part (33) for gradation display.

The material, hardness, thickness, etc. of the elastic mat (10) are not particularly limited. Examples of the material for this elastic mat (10) include rubbers such as natural rubber, synthetic natural rubber, styrene butadiene rubber, butadiene rubber, chloroprene rubber, butyl rubber, nitrile rubber, ethylene/propylene rubber, chlorosulfonated polyethylene rubber, acrylic rubber, urethane rubber, silicone rubber, fluororubber and polysulfide rubber, and thermoplastic elastomers. Among these, silicone rubber, fluororubber, or acrylic rubber is preferable from the viewpoint of impact resilience and heat resistance. Further, examples of the hardness of the elastic mat (10) in accordance with JIS K 6253 include E10 to D100 (preferably, A10 to A90). If the hardness is within the above range, more appropriate pressing force is applied to the raw material during the heat-pressing. In addition, the alphabet attached to the head of the hardness value shows a value measured with a durometer of type E, type D or type A. Further, the thickness of the elastic mat (10) may be, for example, 0.5 to 15 mm (preferably, 2 to 8 mm). If this thickness is within the above range, further appropriate pressing force is applied to the raw material during the heat-pressing.

As the method for producing a skin material according to the present embodiment, there is indicated, for example, a form in which a pressing rib (9a to 9d, 39) for forming a concave part (3a to 3d, 33) is protruded on the surface of the embossing die (8, 38), and, during the heat-pressing, the pressing rib (9a to 9d, 39) presses the front surface side of the raw material (2) in a state where the surface (8a, 38a) of the embossing die is separated from the surface of the raw material (2), thereby forming the at least one of the concave parts (3a to 3d, 33) (see, for example, FIGS. 1A, 1B, 5A, and 5B).

In the case of the above-described form, for example, during the heat-pressing, a protrusion end of the pressing rib (9a to 9d, 39) can be positioned on a side closer to the back surface than a surface height (H) of the elastic mat (10) in the natural state to press the front surface side of the raw material (2) (see, for example, FIGS. 1A, 1B, 5A, and 5B).

As the method for producing a skin material according to the present embodiment, there is indicated, for example, a form in which the raw material (2) includes a base cloth layer (12) including at least thermoplastic resin fibers and made of a knit, and a skin layer (13) bonded to the surface of the base cloth layer, and, during the heat-pressing, the raw material (2) is pressed from the skin layer (13) side by the embossing die (8, 38), thereby forming in the base cloth layer (12) a concave-shaped heat-deformed part (19) due to heat deformation of the thermoplastic resin fibers, and also the skin layer (13) follows the concave shape of the heat-deformed part (19), thereby forming the at least one of the concave parts (3a to 3d, 33) (see, for example, FIGS. 1A, 1B, 5A, and 5B).

Examples of the knit include a three-dimensional knitted fabric, a jersey, and a tricot. Among these, in terms of bulkiness, a three-dimensional knitted fabric is preferable. This three-dimensional knitted fabric can be knitted by, for example, a knitting machine such as a double raschel knitting machine or a circular knitting machine. Also, the three-dimensional knitted fabric can be, for example, a structure in which a front side knitted fabric (15) and a back side knitted fabric (16) are connected by a binding yarn (17). In this case, for example, at least thermoplastic resin fibers are used for the binding yarn (17), and when forming the concave-shaped heat-deformed part (19), the binding yarn (17) can fall down so that thickness of the base cloth layer (12) may become small. As a result, a plurality of concave parts for intensity display and/or a concave part for gradation display can be more clearly formed, and further sufficient cushioning properties can be obtained.

Examples of constituent yarns for the front side knitted fabric (15) and the back side knitted fabric (16) include yarns made of one or a combination of two or more of synthetic fibers, regenerated fibers, natural fibers and the like. Further, a filament yarn is usually used as the binding yarn (17). This filament yarn may be either a multifilament or a monofilament, and may be subjected to known texturing, for example, false twisting. The type of the fibers constituting the filament yarn is not particularly limited, and the fibers may be any of synthetic fibers, recycled fibers, natural fibers, and the like.

The thickness of the base cloth layer (12) is not particularly limited, and can be set to, for example 1 to 20 mm, particularly 2 to 10 mm. If this thickness is within the above range, sufficient cushioning properties can be obtained, and three-dimensional shaping can be performed sufficiently.

The skin layer (13) is usually bonded to one side of the base cloth layer (12) by adhesion, heat welding or the like. As the skin layer (13), known skin materials such as a design cloth (fabric), a resin layer (PU, PVC, PP, etc.), synthetic leather, artificial leather, and natural leather are used. The skin layer (13) may be a single layer or a layer in which a plurality of layers are laminated. The thickness of the skin layer (13) is not particularly limited, and can be set to, for example 0.01 to 10 mm, especially 0.1 to 5 mm. If this thickness is within the above range, the skin layer (13) can favorably follow the surface shape of the base cloth layer (12).

Figure 3:
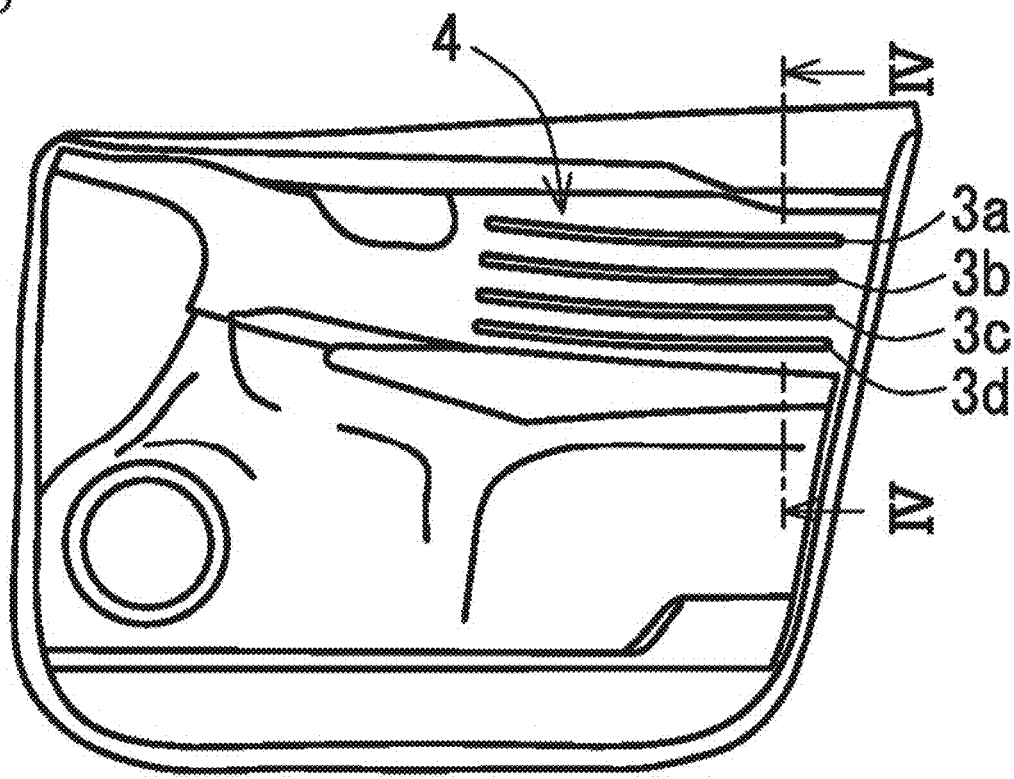
FIG. 3 is a plan view of a door trim provided with the skin material.
Figure 4:
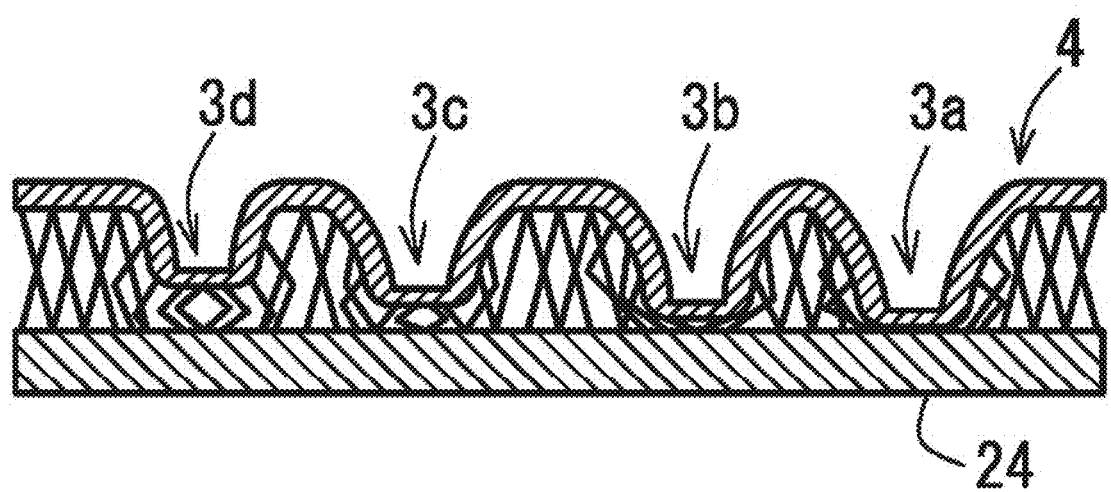
FIG. 4 is an enlarged cross-sectional view taken along line IV-IV of FIG. 3.

The application or the like of the skin material (4) is not particularly limited. This skin material (4) can be used as a structure bonded by adhesion, heat fusion or the like on a base material (24) made of, for example, a synthetic resin, a metal or wood (see, for example, FIGS. 3 and 4). Other functional layers such as a sound absorbing layer and an elastic layer may be interposed between the skin material (4) and the base material (24).

Note that reference signs in parentheses attached to the respective components described in the above embodiment indicate correspondence relationships with specific components referred to in the Examples that will be described later.

EXAMPLES

Hereinafter, the present invention will be described in detail by way of Examples with reference to the accompanying drawings. In addition, in the present Example, a skin material 4 bonded to a door ornament 24 (base material) in a door trim for automobiles is illustrated as the "skin material" according to the present invention (see FIGS. 3 and 4).

Example 1

(1) Method for Producing Skin Material

In a method for producing a skin material according to the present Example, as shown in FIGS. 1A and 1B, a raw material 2 is heat-pressed by an embossing machine 1 to obtain a skin material 4 having a plurality of (four in FIGS. 1A and 1B) concave parts 3a to 3d for intensity display formed (i.e., shaped) on the front surface side and a flat back surface.

The embossing machine 1 includes a lower metal pedestal 6 (also referred to as a "surface plate") and an upper metal pedestal 7 (also referred to as "upper die") which can be moved closer to or away from the pedestal 6. Each of these pedestals 6, 7 can be heated by a heating means (not shown). Further, an embossing die 8 is provided on the bottom of the pedestal 7. On a surface 8a of the embossing die 8, a plurality of (four in FIGS. 1A and 1B) pressing ribs 9a to 9d having different protrusion heights are protruded. Each of the pressing ribs 9a to 9d is formed in a long plate shape so that they are juxtaposed with each other.

An elastic mat 10 made of silicone rubber is laid on the upper surface of the pedestal 6. The hardness of the elastic mat 10 in accordance with JIS K 6253 is set to about A10 to A90. Furthermore, the thickness of the elastic mat 10 is set to about 2 to 8 mm.

As shown in FIG. 2A, the raw material 2 includes a base cloth layer 12 made of a knit, and a skin layer 13 adhered to a surface of the base cloth layer 12 with an adhesive. The base cloth layer 12 has a thickness of about 4 mm. The skin layer 13 has a thickness of about 0.4 mm. Also, the knit is a three-dimensional knitted fabric obtained using a double raschel knitting machine (or circular knitting machine). This three-dimensional knitted fabric has a structure in which a front side knitted fabric 15 and a back side knitted fabric 16 are connected by a binding yarn 17. The constituent yarns for the front side knitted fabric 15 are polyester resin fibers, and the thickness thereof is about 0.4 mm. Moreover, the constituent yarns of the back side knitted fabric 16 are polyester resin fibers, and the thickness thereof is about 0.4 mm. Furthermore, the binding yarn 17 is a polyester resin fiber.

In the method for producing a skin material, as shown in FIG. 1A, the raw material 2 is placed on the elastic mat 10 of the embossing machine 1 in a die open state so that the base cloth layer 12 is on the elastic mat 10 side, and the embossing die 8 is lowered together with the pedestal 7. Then, as shown in FIG. 1B, the raw material 2 is heat-pressed between the embossing die 8 and the elastic mat 10, and the pressing ribs 9a to 9d of the embossing die 8 press the front surface side of the raw material 2, so that the plurality of concave parts 3a to 3d for intensity display are formed. In the present Example, the heat-pressing is performed under the conditions: a heating time of about 20 seconds, a pedestal temperature of about 200° C., and an embossing die temperature of about 150° C.

In the case of the heat-pressing, in a state where the surface 8a of the embossing die 8 is separated from the surface of the raw material 2, the pressing ribs 9a to 9d have a protrusion end positioned on a side closer to the back surface than a surface height H of the elastic mat 10 in a natural state (i.e., a non-load state) to press the front surface side of the raw material 2. At this time, depending on the different pressing heights (that is, pressing amounts) of the pressing ribs 9a to 9d of the embossing die 8, a difference is generated in the repulsive force by the elastic mat 10, so that appropriate pressing force is applied to the raw material 2. Then, the binding yarn 17 falls down to form a concave-shaped heat-deformed part 19 in the base cloth layer 12, and the skin layer 13 follows the concave shape of the heat-deformed part 19 to form the plurality of concave parts 3a to 3d for intensity display. The heat-deformed part 19 is adjusted to have a predetermined thickness smaller than the thickness of the base cloth layer 12.

Figure 2B:
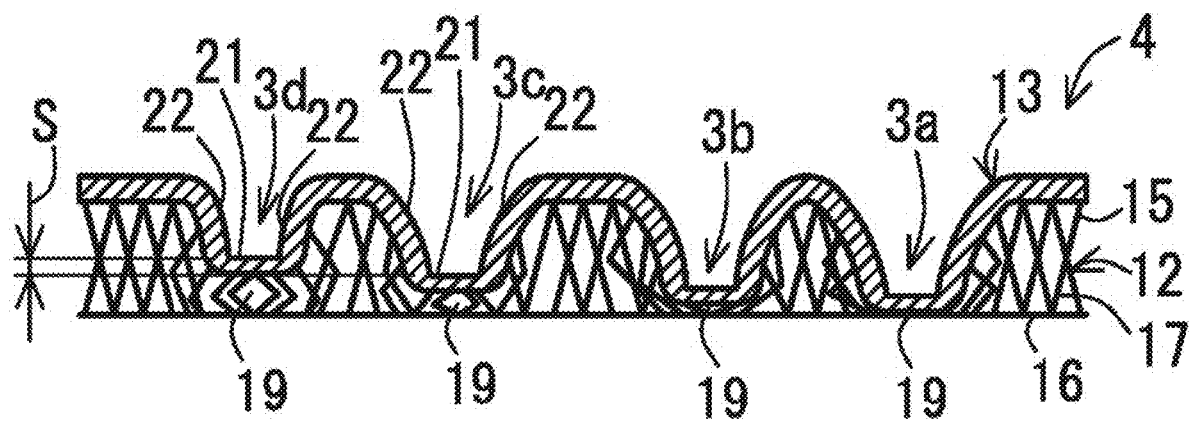

As shown in FIG. 2B, the concave parts 3a to 3d for intensity display each include a bottom 21 and side surfaces 22 rising from both side edges of the bottom 21 in a longitudinal cross section along the depth direction of the skin material 4. The both side surfaces 22 are formed in a curved shape so as to be separated from each other toward the opening side of the concave parts 3a to 3d. In addition, the concave parts 3a to 3d for intensity display each have a linear plane shape, and are juxtaposed with each other. Further, each of the concave parts 3a to 3d for intensity display is arranged such that the depth of the bottom 21 becomes shallow (or deep) in order along the arranging direction. Furthermore, in a vertical cross section in the thickness direction of the skin material 4, a difference S in protrusion height between the adjacent concave parts 3a to 3d for intensity display is about 0.5 to 3 mm.

(2) Effects of Example

According to the method for producing a skin material of the present Example, the raw material 2 is heat-pressed between the embossing die 8 and the elastic mat 10 to form, as the concave parts, the plurality of concave parts 3a to 3d for intensity display which are different in depth of the bottom. As a result, depending on the pressing height (that is, pressing amount) of the embossing die 8, a difference is generated in the repulsive force by the elastic mat 10, so that pressing force appropriate for the raw material 2 is applied. Therefore, it is possible to clearly form the plurality of concave parts 3a to 3d for intensity display by single heat-pressing. Then, the plurality of concave parts 3a to 3d for intensity display are used to express the intensity (that is, deep or shallow) of emboss depth excellent in aesthetic appearance.

Further, in the present Example, the elastic mat 10 is formed of silicone rubber. As a result, by adopting the elastic mat 10 excellent in impact resilience and heat resistance, more appropriate pressing force is applied to the raw material 2, thereby making it possible to form the plurality of concave parts 3a to 3d for intensity display more clearly.

Further, in the present Example, the elastic mat 10 has a hardness of about A10 to A90 in accordance with JIS K 6253. As a result, by adopting the relatively soft elastic mat 10, more appropriate pressing force is applied to the raw material 2, thereby making it possible to form the plurality of concave parts 3a to 3d for intensity display more clearly.

Further, in the present Example, the pressing ribs 9a to 9d are protruded on the surface 8a of the embossing die 8, and, during the heat-pressing, the pressing ribs 9a to 9d press the front surface side of the raw material 2 in a state where the surface 8a of the embossing die 8 is separated from the surface of the raw material 2, thereby forming the plurality of concave parts 3a to 3d for intensity display. Thereby, the surface heat deterioration of the skin material 4 is suppressed by reducing the contact region of the embossing die 8 with the raw material 2 to the necessary minimum.

Further, in the present Example, during the heat-pressing, the protrusion end of the pressing ribs 9a to 9d is positioned closer to the back surface than the surface height H of the elastic mat 10 in a natural state to press the front surface side of the raw material 2. As a result, more appropriate pressing force is applied to the raw material 2, thereby making it possible to form the plurality of concave parts 3a to 3d for intensity display more clearly.

Furthermore, in the present Example, the raw material 2 includes the base cloth layer 12 and the skin layer 13, and, during the heat-pressing, the raw material 2 is pressed from the skin layer 13 side by the embossing die 8, thereby forming the concave-shaped heat-deformed part 19 in the base cloth layer 12 due to heat deformation of the thermoplastic resin fibers, and also the skin layer 13 follows the concave shape of the heat-deformed part 19, thereby forming the plurality of concave parts 3a to 3d for intensity display. Thus, by adopting the base cloth layer 12 made of a knit, it is possible to more clearly form the plurality of concave parts 3a to 3d for intensity display and to obtain sufficient cushioning properties.

Furthermore, in the present Example, at least thermoplastic resin fibers are used for the binding yarns 17, and when forming the concave-shaped heat-deformed part 19, the binding yarns 17 fall down so that the thickness of the base cloth layer 12 becomes smaller. As a result, the plurality of concave parts 3a to 3d for intensity display can be formed more clearly, and further sufficient cushioning properties can be obtained.

Furthermore, in the present Example, since the back surface of the skin material 4 is flat, the skin material 4 can be easily and reliably joined to the door ornament 24.

Example 2

Next, a method for producing a skin material according to Example 2 will be described. The same components as in the method for producing a skin material according to Example 1 are denoted by the same reference signs and detailed description thereof is omitted. The embossing die or the like, as a difference between the Examples, will be described in detail.

(1) Method for Producing Skin Material

Figure 5A:
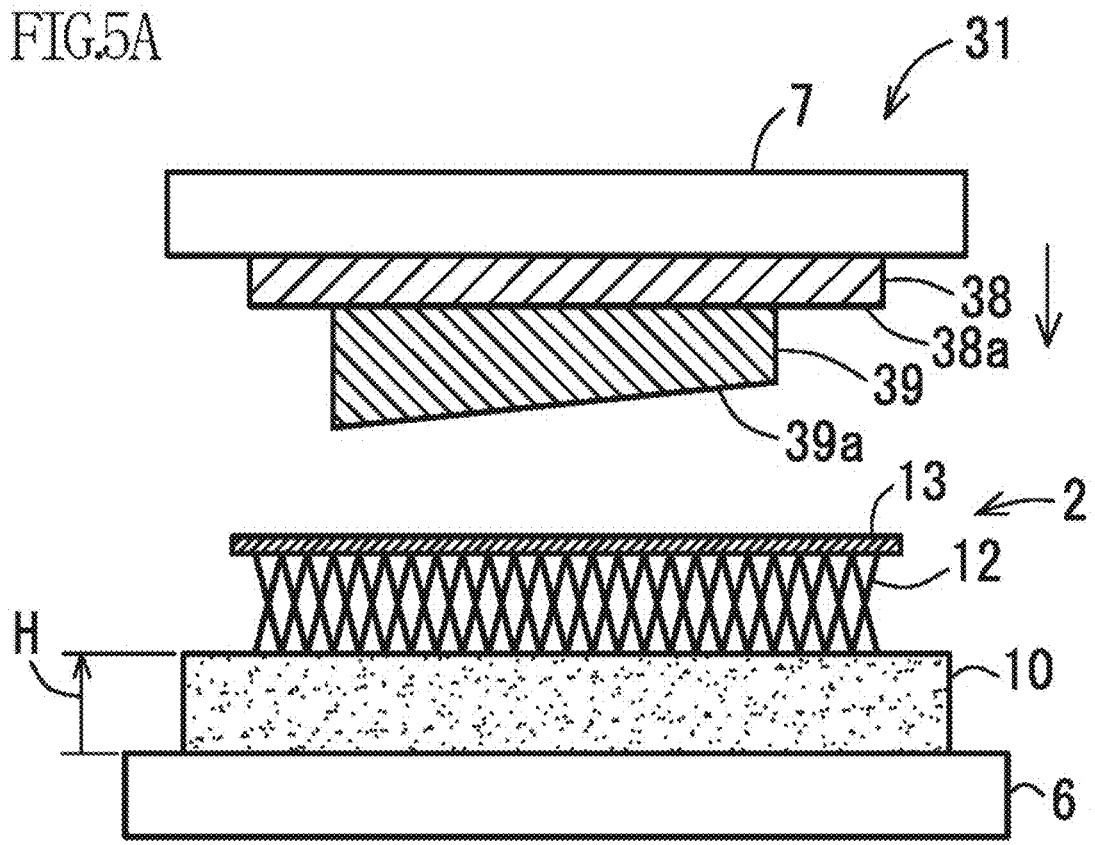
Figure 5B:
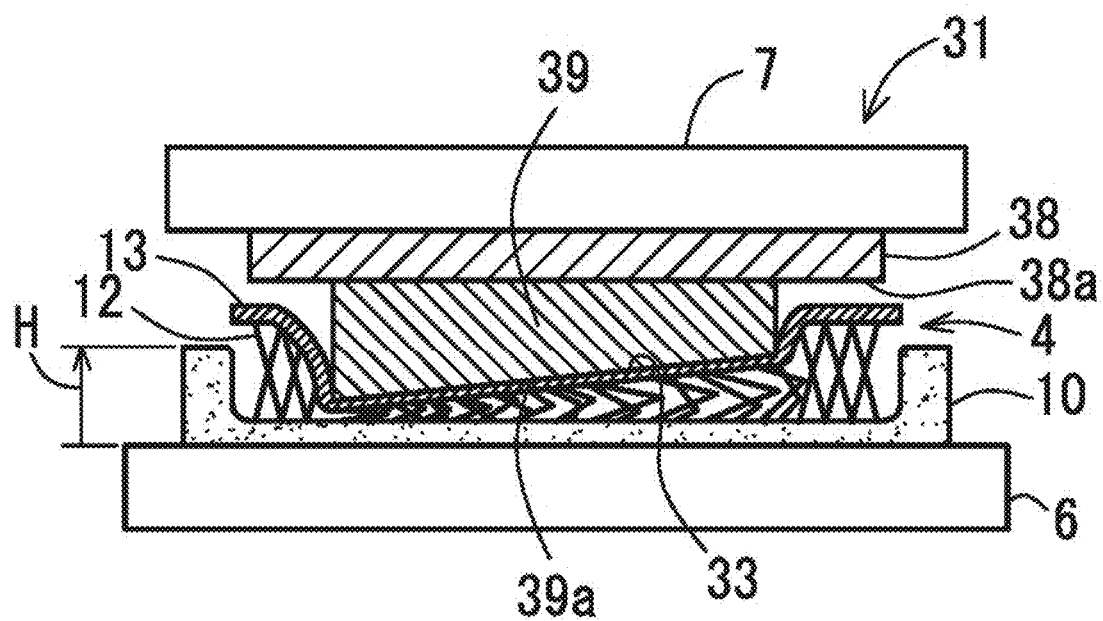

In a method for producing a skin material according to the present embodiment, as shown in FIGS. 5A and 5B, a raw material is heat-pressed by an embossing machine 31 to obtain a skin material 4 having a concave part 33 for gradation display formed (i.e., shaped) on the front surface side and a flat back surface.

An embossing die 38 is provided on the bottom of the pedestal 7 of the embossing machine 31. On the surface 38a of the embossing die 38, a pressing rib 39 having a protrusion end face 39a whose protrusion height gradually changes is protruded.

In the method for producing a skin material, as shown in FIG. 5A, the raw material 2 is placed on the elastic mat 10 of the embossing machine 31 in a die open state so that the base cloth layer 12 is on the elastic mat 10 side, and the embossing die 38 is lowered together with the pedestal 7. Then, as shown in FIG. 5B, the raw material 2 is heat-pressed between the embossing die 38 and the elastic mat 10, and the pressing rib 39 of the embossing die 38 presses the front surface side of the raw material 2, so that the concave part 33 for gradation display is formed. In the present Example, the heat-pressing is performed under the conditions: a heating time of about 20 seconds, a pedestal temperature of about 200° C., and an embossing die temperature of about 150° C.

In the case of the heat-pressing, in a state where the surface 38a of the embossing die 38 is separated from the surface of the raw material 2, the pressing rib 39 has a protrusion end (specifically, protrusion end face 39a) positioned on a side closer to the back surface than a surface height H of the elastic mat 10 in a natural state (i.e., a non-load state) to press the front surface side of the raw material 2. At this time, depending on the gradually changing pressing heights (that is, pressing amounts) of the pressing rib 39 of the embossing die 38, a difference is generated in the repulsive force by the elastic mat 10, so that appropriate pressing force is applied to the raw material 2. Then, the binding yarn 17 falls down to form a concave-shaped heat-deformed part 19 in the base cloth layer 12, and the skin layer 13 follows the concave shape of the heat-deformed part 19 to form the concave part 33 for gradation display. The heat-deformed part 19 is adjusted to have a predetermined thickness smaller than the thickness of the base cloth layer 12.

Figure 6B:
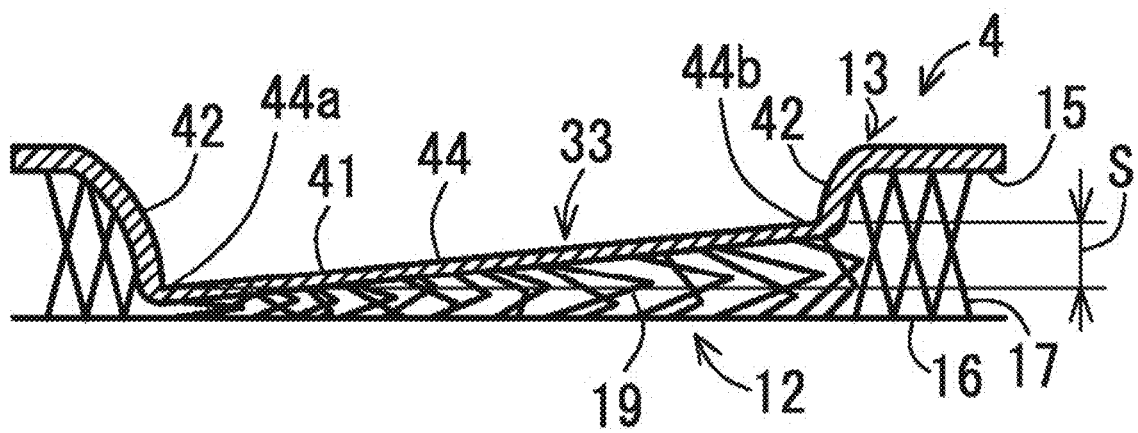

As shown in FIG. 6B, the concave part 33 for gradation display includes a bottom 41 and side surfaces 42 rising from both side edges of the bottom 41 in a longitudinal cross section along the depth direction of the skin material 4. The both side surfaces 42 are formed in a curved shape so as to be separated from each other toward the opening side of the concave part 33 for gradation display. Further, the plane shape of the concave part 33 for gradation display is planar. Furthermore, the concave part 33 for gradation display has an inclined surface 44 which is inclined with respect to the back surface of the skin material 4 in a longitudinal cross section in the thickness direction of the skin material 4.

(2) Effects of Example

According to the method for producing a skin material of the present Example, the raw material 2 is heat-pressed between the embossing die 38 and the elastic mat 10 to form, as the concave part, the concave part 33 for gradation display in which the depth of the bottom gradually changes. As a result, depending on the pressing height (that is, pressing amount) of the embossing die 38, a difference is generated in the repulsive force by the elastic mat 10, so that pressing force appropriate for the raw material 2 is applied.

Therefore, it is possible to clearly form the concave part 33 for gradation display by single heat-pressing. The concave part 33 for gradation display is used to the gradation of emboss depth excellent in aesthetic appearance.

Further, in the present Example, the elastic mat 10 is formed of silicone rubber. As a result, by adopting the elastic mat 10 excellent in impact resilience and heat resistance, more appropriate pressing force is applied to the raw material 2, thereby making it possible to form the concave parts 33 for gradation display more clearly.

Further, in the present Example, the elastic mat 10 has a hardness of about A10 to A90 in accordance with JIS K 6253. As a result, by adopting the relatively soft elastic mat 10, more appropriate pressing force is applied to the raw material 2, thereby making it possible to form the concave part 33 for gradation display more clearly.

Further, in the present Example, the pressing rib 39 is protruded on the surface 38a of the embossing die 38, and, during the heat-pressing, the pressing rib 39 presses the front surface side of the raw material 2 in a state where the surface 38a of the embossing die 38 is separated from the surface of the raw material 2, thereby forming the concave part 33 for gradation display. Thereby, the surface heat deterioration of the skin material 4 is suppressed by reducing the contact region of the embossing die 38 with the raw material 2 to the necessary minimum.

Further, in the present Example, during the heat-pressing, the protrusion end of the pressing rib 39 is positioned closer to the back surface than the surface height H of the elastic mat 10 in a natural state to press the front surface side of the raw material 2. As a result, more appropriate pressing force is applied to the raw material 2, thereby making it possible to form the concave part 33 for gradation display more clearly.

Furthermore, in the present Example, the raw material 2 includes the base cloth layer 12 and the skin layer 13, and, during the heat-pressing, the raw material 2 is pressed from the skin layer 13 side by the embossing die 38, thereby forming the concave-shaped heat-deformed part 19 in the base cloth layer 12 due to heat deformation of the thermoplastic resin fibers, and also the skin layer 13 follows the concave shape of the heat-deformed part 19, thereby forming the concave part 33 for gradation display. Thus, by adopting the base cloth layer 12 made of a knit, it is possible to more clearly form the concave part 33 for gradation display and to obtain sufficient cushioning properties.

Furthermore, in the present Example, at least thermoplastic resin fibers are used for the binding yarns 17, and when forming the concave-shaped heat-deformed part 19, the binding yarns 17 fall down so that the thickness of the base cloth layer 12 becomes smaller. As a result, the concave part 33 for gradation display can be formed more clearly, and further sufficient cushioning properties can be obtained.

Furthermore, in the present Example, since the back surface of the skin material 4 is flat, the skin material 4 can be easily and reliably joined to the door ornament (base material) 24.

Experimental Example and Comparative Example

Figure 7A:
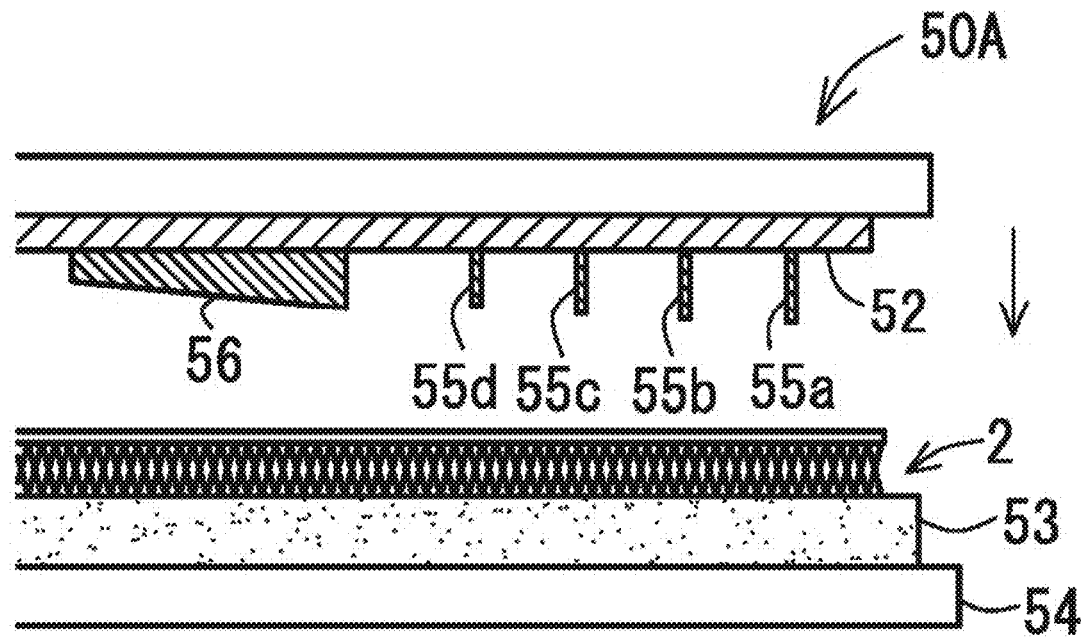
Figure 7B:
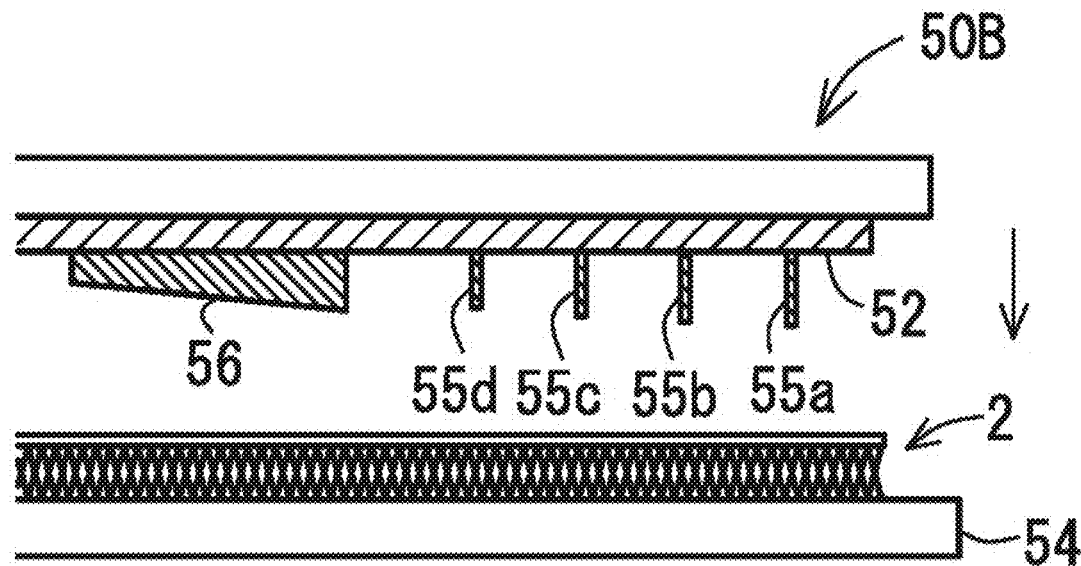

Next, methods for producing a skin material according to an experimental example and a comparative example will be described. In the method for producing a skin material of the present experimental example, an embossing machine 50A (see FIG. 7A) is used. In the embossing machine 50A, the raw material 2 is heat-pressed between an embossing die 52 and an elastic mat 53 to obtain a skin material 59A. On the other hand, in the method for producing a skin material according to the comparative example, an embossing machine 50B (see FIG. 7B) is used. In the embossing machine 50B, the raw material 2 is heat-pressed between an embossing die 52 and a metal pedestal 54 to obtain a skin material 59B.

Figure 9:
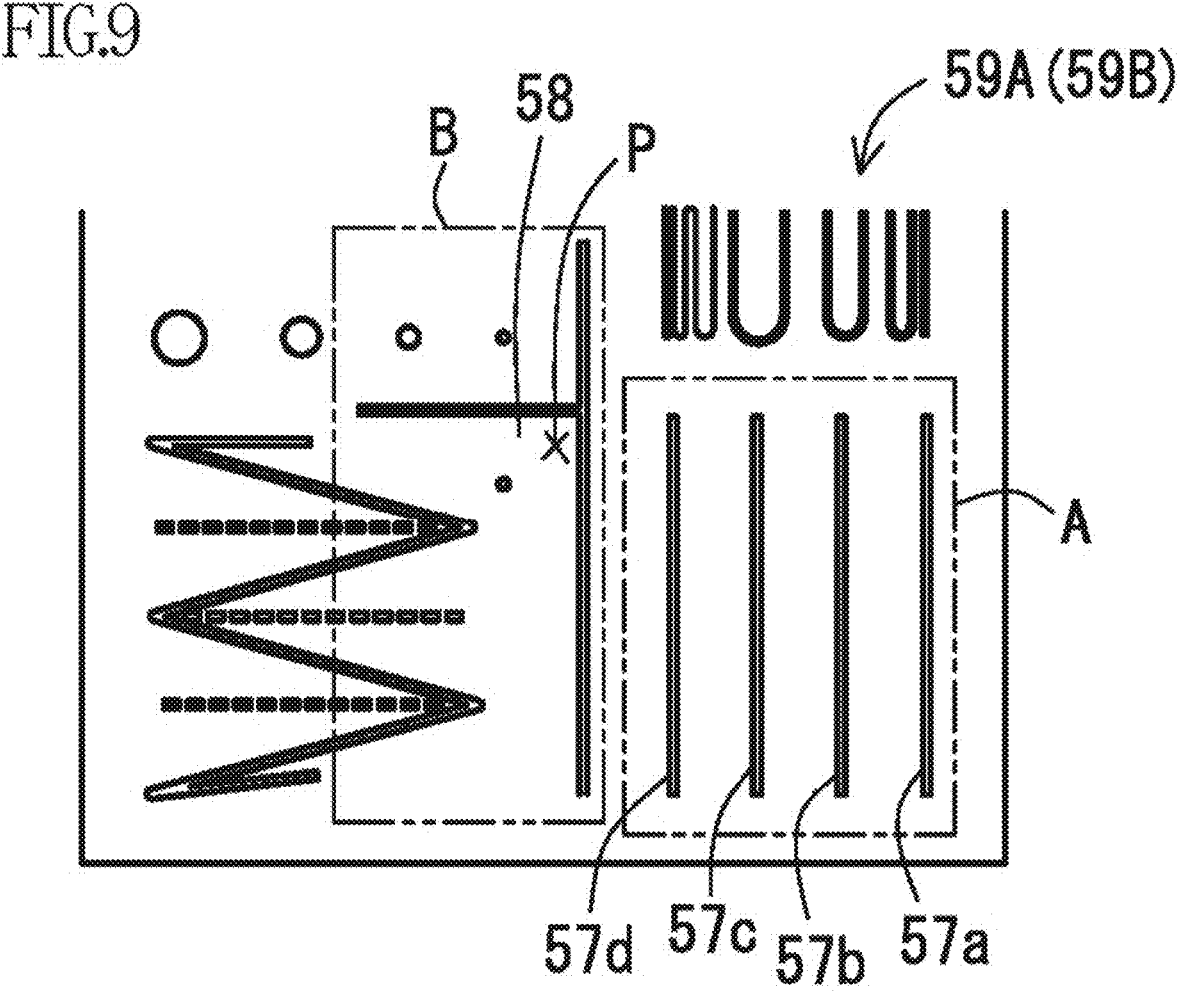
FIG. 9 is a schematic view of the emboss pattern of the skin material.

On the surface of the embossing die 52, a plurality of (four in FIGS. 7A and 7B) pressing ribs 55a to 55d having different protrusion heights and a pressing rib 56 having a protrusion end face whose protrusion height gradually changes are provided. Each of the pressing ribs 55a to 55d and 56 is for forming a plurality of concave parts 57a to 57d for intensity display in a region A of the emboss pattern (test pattern) of the skin material 59A or 59B, as shown in FIG. 9. Further, the pressing rib 56 is for forming a concave part 58 for gradation display in a region B of the emboss pattern (test pattern) of the skin material 59A or 59B. The concave part 58 is gradually shallowed in the left and vertical directions of the sheet of FIG. 9 from a deepest part P. In addition to the pressing ribs 55a to 55d and 56, other pressing ribs (not shown) for forming concave parts of various shapes are protruded on the surface of the embossing die 52.

In the method for producing a skin material according to the present experimental example, the raw material 2 was heat-pressed using the embossing machine 50A to obtain the skin material 59A with a predetermined emboss pattern (test pattern). On the other hand, in the method for producing a skin material according to the comparative example, the raw material 2 was heat-pressed using the embossing machine 50B to obtain the skin material 59B with a predetermined emboss pattern (test pattern). Then, the emboss patterns (test patterns) of the skin materials 59A and 59B of the examples were observed.

Figure 8A:
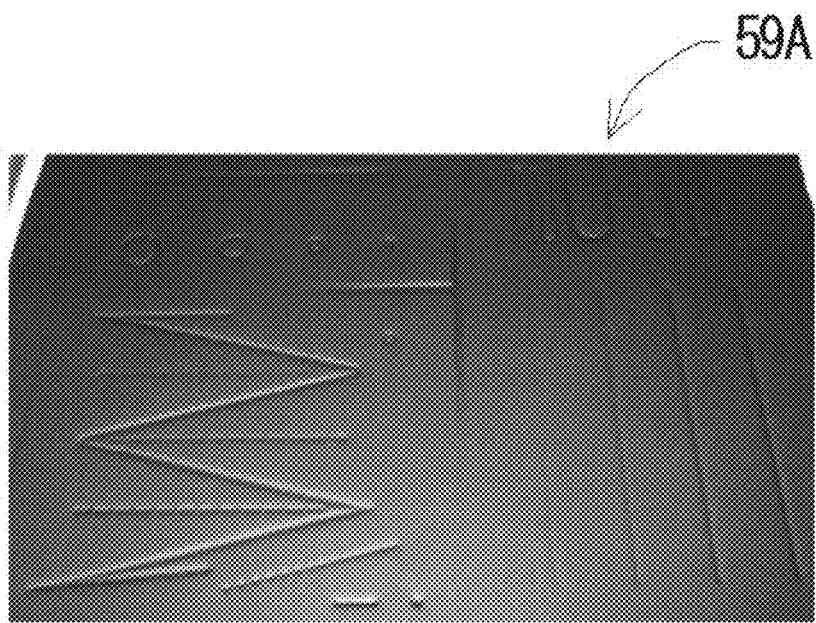
Figure 8B:
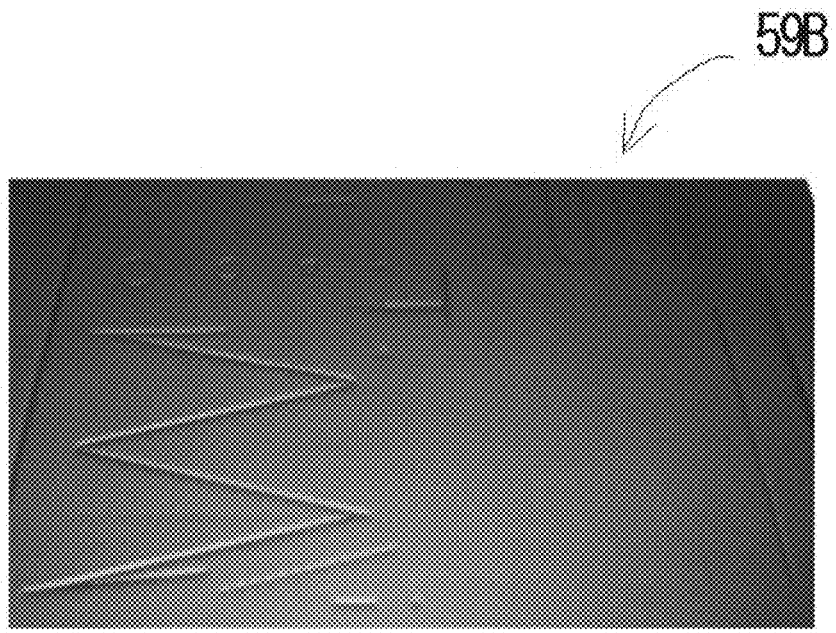

As a result, in the emboss pattern (test pattern) of the skin material 59A, as shown in FIG. 8A, the plurality of concave parts 57a to 57d for intensity display and the concave part 58 for gradation display were clearly formed. On the other hand, in the emboss pattern (test pattern) of the skin material 59B, as shown in FIG. 8B, the relatively shallow concave parts among the plurality of concave parts 57a to 57d for intensity display were not clearly formed. Furthermore, the relatively shallow portion of the concave part 58 for gradation display was not clearly formed.

Figure 10A:
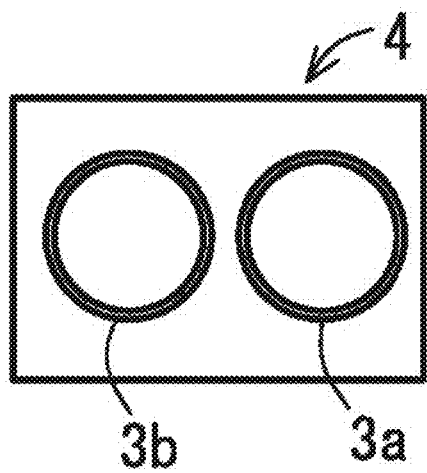
Figure 10B:
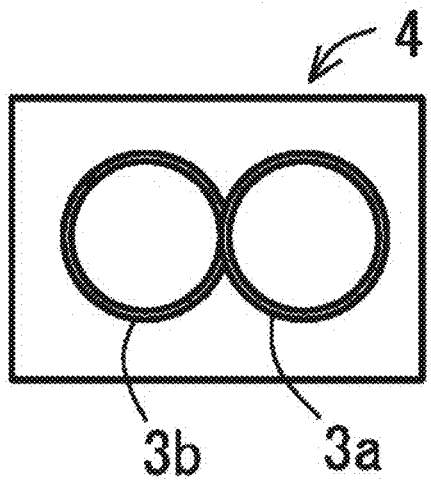

The present invention is not limited to the above-described Example, and can be variously modified within the scope of the present invention depending on the purpose and application. Specifically, the skin material 4 in which the linear concave parts 3a to 3d for intensity display are formed has been illustrated in Example 1, but the present invention is not limited thereto. For example, as shown in FIGS. 10A and 10B, the skin material 4 may be formed with annular concave parts 3a and 3b for intensity display.

Further, the skin material 4 in which the plurality of independent concave parts 3a to 3d for intensity display are formed has illustrated in Example 1, but the present invention is not limited thereto. For example, as shown in FIG. 10B, the skin material 4 may be formed with a plurality of continuous concave parts 3a and 3b for intensity display.

Figure 10C:
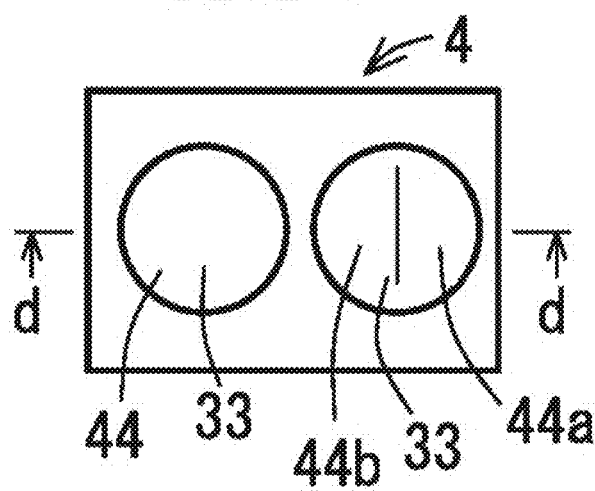
Figure 10D:
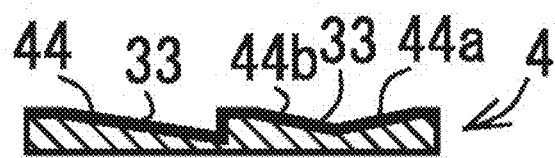

Moreover, the skin material 4 in which the single concave part 33 for gradation display is formed has been illustrated in the Example 2, but the present invention is not limited thereto. For example, as shown in FIGS. 10C and 10D, the skin material 4 may be formed with a plurality of concave parts 33a for gradation display and 33b.

Moreover, the skin material 4 in which the concave part 33 for gradation display having the single inclined surface 44 at the bottom is formed has been illustrated in the Example 2, but the present invention is not limited thereto. For example, as shown in FIGS. 10C and 10D, the skin material 4 may be formed with a concave part 33 for gradation display having a plurality of mutually crossing inclined surfaces 44a and 44b at the bottom.

In addition, the skin material 4 may be formed by combining the plurality of concave parts 3a to 3d for intensity display of Example 1 and the concave part 33 for gradation display of Example 2.

Moreover, the raw material 2 provided with the base cloth layer 12 made of a knit has been illustrated in the Examples 1 and 2, but the present invention is not limited thereto, For example, the raw material 2 may be provided with the base cloth layer 12 made of a fabric such as a textile or a nonwoven fabric, a foam sheet or the like.

Figure 11A:
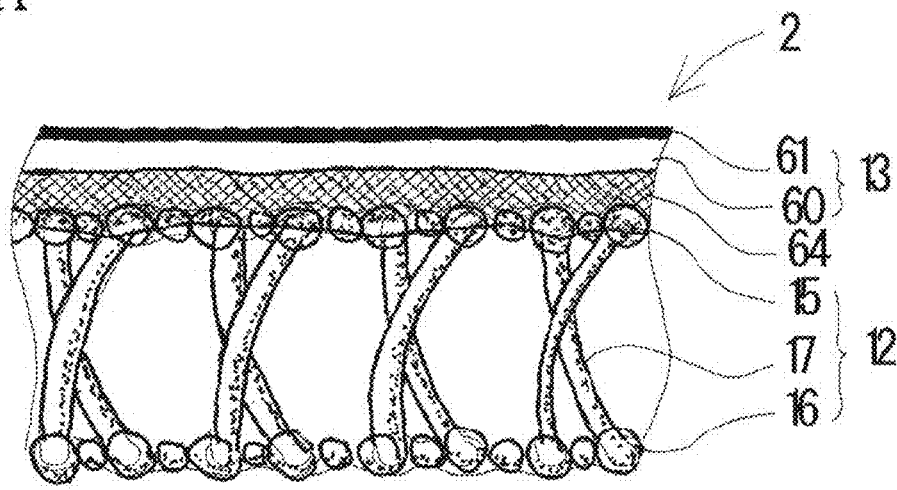
Figure 11B:
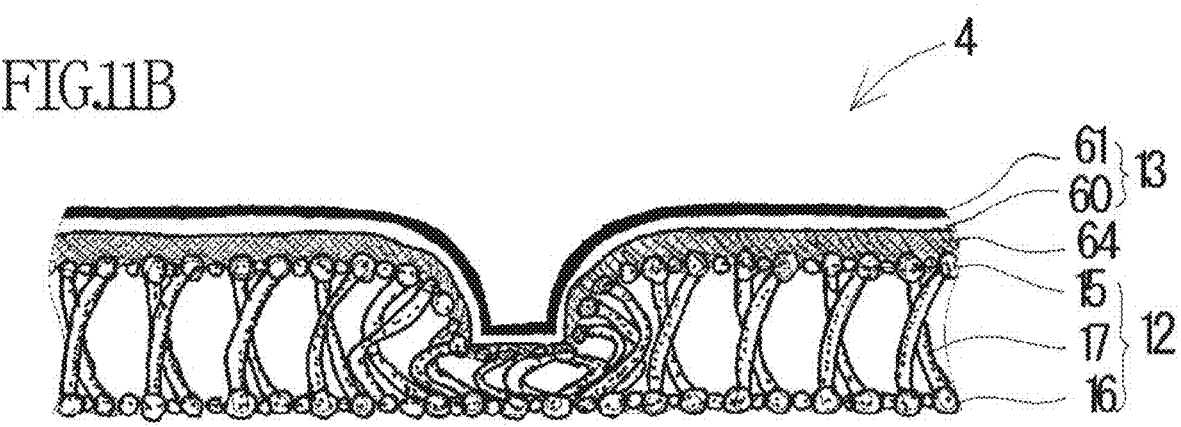
Figure 12A:
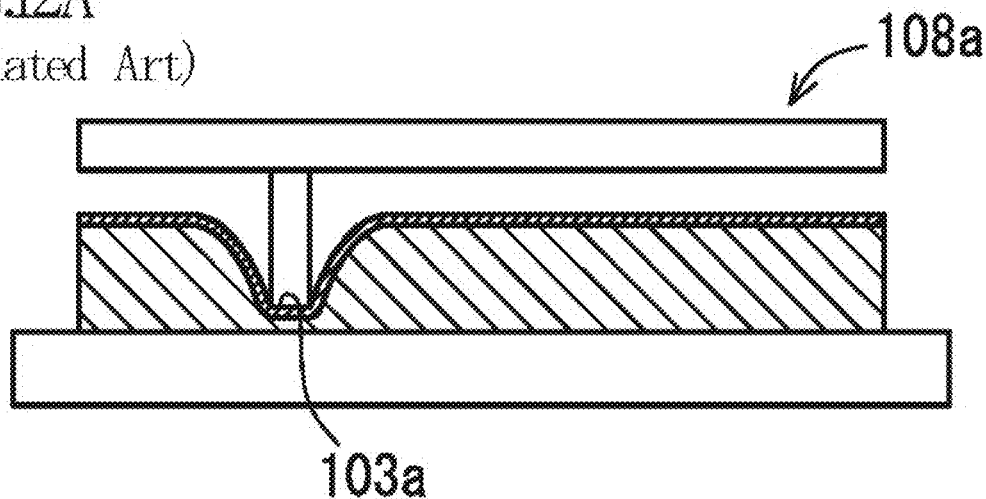
Figure 12B:
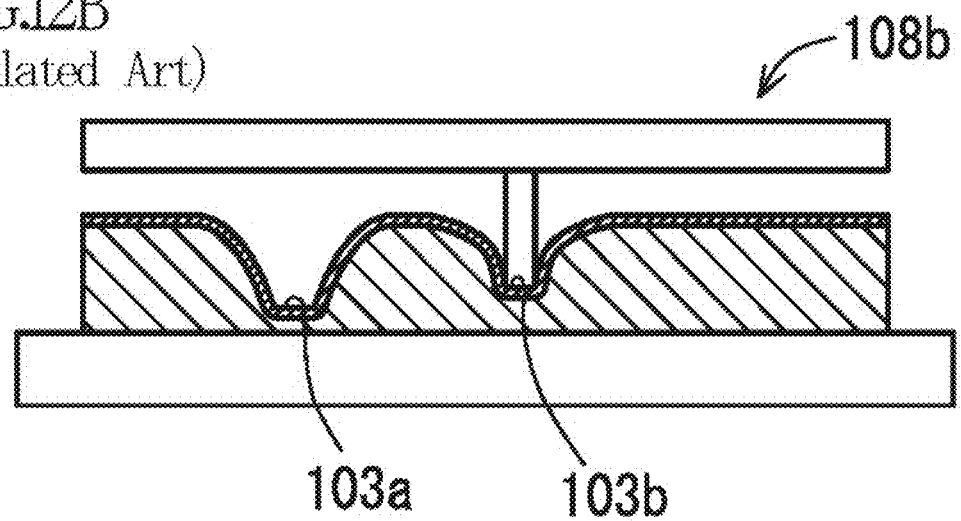
Figure 12C:
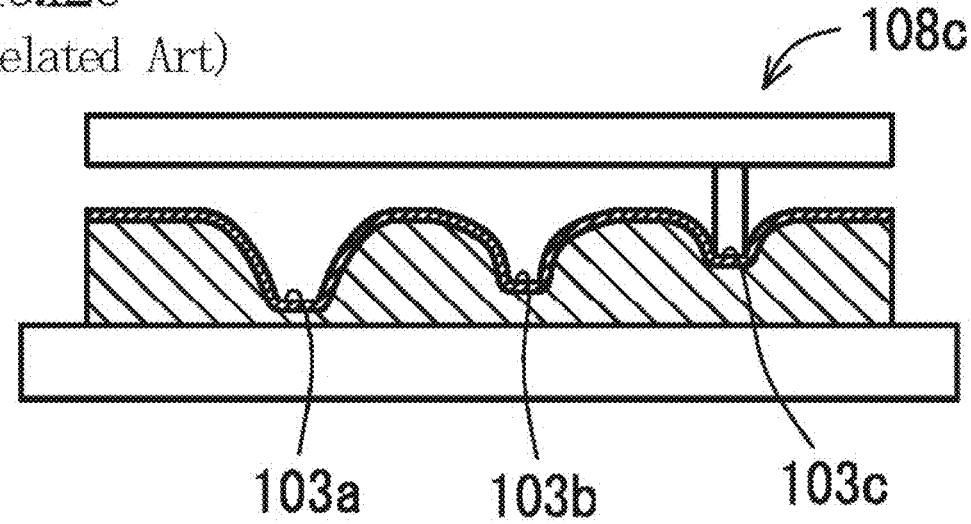

Moreover, the raw material 2 provided with the single skin layer 13 has been illustrated in the Examples 1 and 2, but the present invention is not limited thereto. For example, as shown in FIG. 11, the raw material may be provided with a plurality of skin layers 13. In this case, for example, a raw material 2 provided with a skin layer 13 formed by laminating a surface treatment layer 61 on the surface of a design layer 60 can be adopted. In addition, the reference sign "64" in FIGS. 10A to 10D represents an adhesive layer.

Moreover, in Examples 1 and 2, the heating temperature, time, etc. of heat-pressing are suitably selected according to the material for the raw material 2, the shapes of the concave parts, etc. The heating temperature can be, for example, 100 to 200° C. (particularly 120 to 180° C.). The heating time may be different or identical between on the front surface side and on the back surface side of the raw material. The heating time can be set to, for example, 0.1 to 600 seconds.

Furthermore, the forms in which the embossing dies 8 and 38 are relatively moved adjacent to or away from the pedestal 6 to heat-press the raw material 2 between the embossing dies 8 and 38 and the elastic mat 10 have illustrated in Examples 1 and 2, but the present invention is not limited thereto. For example, a roll-shaped embossing die may be rotated to heat-press the raw material 2 between the embossing die and the elastic mat 10.

Furthermore, the skin material 4 provided in the door trim has been illustrated in Examples 1 and 2, but the present invention is not limited thereto. For example, the skin material 4 may be provided in vehicle interior materials such as roof trims and seats, furniture such as sofas, or household goods such as bags, wallets, and clothes.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely used in the field related to skin materials in various industries such as vehicles (automobiles and railway vehicles), aircraft, ships, buildings, and apparel.

What is claimed is:

1. A method for producing a skin material, the method comprising:
    heat-pressing a raw material using an embossing die to obtain the skin material having a concave part formed on a front surface side of the raw material and a flat back surface of the raw material,
    wherein the raw material is heat-pressed between the embossing die and an elastic mat to form, as the concave part that includes a bottom, at least one of:
        a plurality of concave parts for intensity display having different depths of the bottom, and
        a concave part for gradation display in which a depth of the bottom gradually changes, and
    wherein, during the heat-pressing, an end of the embossing die that contacts the bottom of at least one of the concave part is disposed closer to the flat back surface than to a surface height of the elastic mat in a natural state.

2. The method for producing a skin material according to claim 1, wherein the elastic mat is formed of silicone rubber, fluororubber, or acrylic rubber.

3. The method for producing a skin material according to claim 1, wherein the elastic mat has a hardness of E10 to D100 in accordance with JIS K 6253.

4. The method for producing a skin material according to claim 1,
    wherein a pressing rib that forms the concave part is protruded from a surface of the embossing die, and
    wherein, during the heat-pressing, the pressing rib presses the front surface side of the raw material in a condition in which the surface of the embossing die is separated from the front surface side of the raw material, thereby forming the at least one of the concave parts for intensity display and the concave part for gradation display.

5. The method for producing a skin material according to claim 4, wherein, during the heat-pressing, a protrusion end of the pressing rib is positioned on a side closer to the flat back surface than the surface height of the elastic mat in the natural state to press the front surface side of the raw material.

6. The method for producing a skin material according to claim 1,
    wherein the raw material includes a base cloth layer comprising at least thermoplastic resin fibers and made of a knit, and a skin layer bonded to a surface of the base cloth layer, and
    wherein, during the heat-pressing, the raw material is pressed from a skin layer side by the embossing die, thereby forming in the base cloth layer a concave-shaped heat-deformed part due to heat deformation of the thermoplastic resin fibers, and also the skin layer follows a concave shape of the heat-deformed part, thereby forming the at least one of the concave parts for intensity display and the concave part for gradation display.

7. The method for producing a skin material according to claim 1, wherein the elastic mat has a hardness of A10 to A90 in accordance with JIS K 6253.

8. The method for producing a skin material according to claim 1, wherein the heat-pressing includes a heating temperature of the heat-pressing that is 100° C. to 180° C.

9. The method for producing a skin material according to claim 1, wherein during the heat-pressing, a temperature of a metal pedestal that supports at least one of the embossing die and the elastic mat is higher than a temperature of the embossing die.

10. The method for producing a skin material according to claim 1, wherein during the heat-pressing, a depth difference that is formed between the different depths or that is formed from the depth that gradually changes is in a range of 0.1 to 5 mm.

11. The method for producing a skin material according to claim 1, wherein during the heat-pressing, the bottom of at least one of the concave part is inclined with respect to the flat back surface of the raw material.

12. The method for producing a skin material according to claim 1, further comprising bonding the skin material to a base material in a door trim.

\* \* \* \* \*